June 23, 1942.  R. J. VEDOVELL  2,287,207

SEAL

Filed Nov. 28, 1940

INVENTOR.
Rudolph J Vedovell,
BY Cromwell, Greist & Warden
ATTYS

Patented June 23, 1942

2,287,207

UNITED STATES PATENT OFFICE 2,287,207

SEAL

Rudolph J. Vedovell, Kenilworth, Ill., assignor to Chicago Rawhide Manufacturing Company, Chicago, Ill., a corporation of Illinois Application November 28, 1940, Serial No. 367,605

2 Claims. (Cl. 286—11)

This invention relates to end-thrust seals of the type ordinarily used about a shaft between two axially separated members for sealing off the space present between such members.

The purpose of the invention is to provide an improved end-thrust seal which is inexpensive to manufacture and which will operate efficiently to prevent passage of the oil, grease, gas, or other fluid with which used.

Other more specific objects and advantages of the invention will be evident upon a full understanding of the novel structural features of the improved seal.

A preferred embodiment of the invention is presented herein for the purpose of exemplification, but it will of course be appreciated that the invention is susceptible of embodiment in various other structurally modified forms coming equally within the scope of the appended claims.

Figure 1:
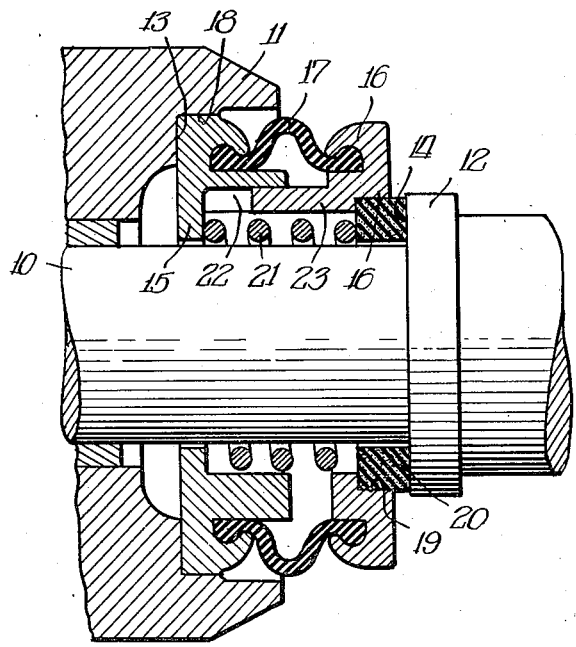
Fig. 1 is a diametric section through an end-thrust seal constructed in accordance with the invention, showing the same installed about a shaft between two axially spaced and relatively rotatable machine parts.
Figure 2:
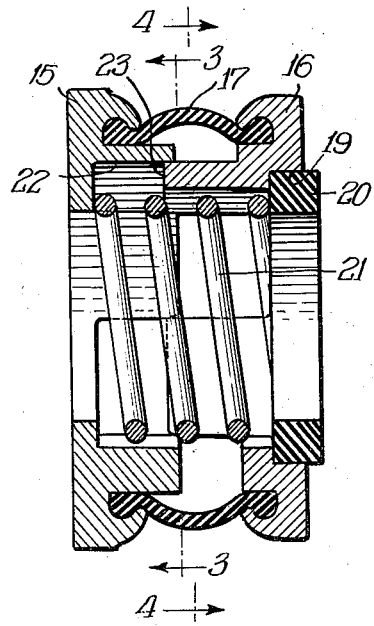
Fig. 2 is a similar section through the seal, showing the same in its expanded condition prior to installation.
Figure 3:
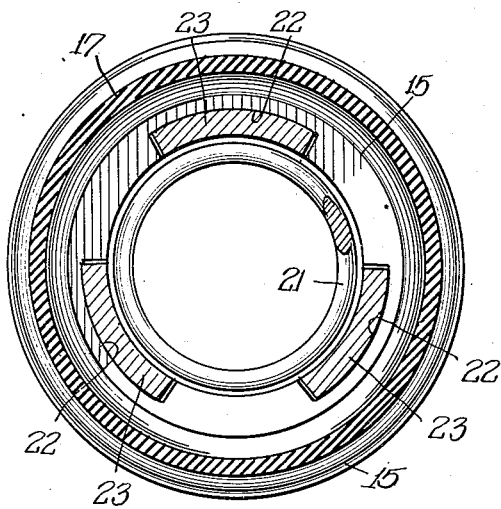
Fig. 3 is a section through the seal, taken on the line 3—3 of Fig. 2.
Figure 4:
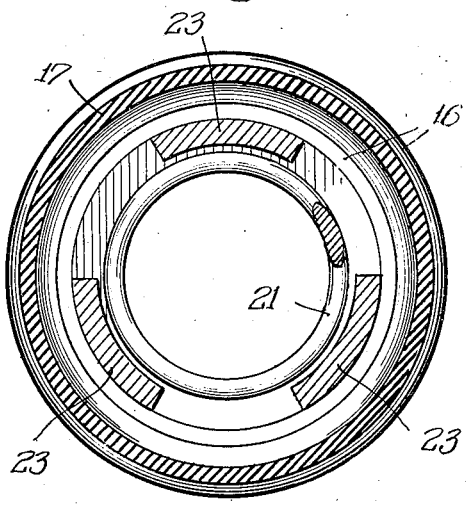
Fig. 4 is another section through the seal, taken on the line 4—4 of Fig. 2.

As will be observed in Fig. 1 of the drawing, the seal is adapted to be positioned about a shaft 10 between one end of a housing 11 from which the shaft projects and a part 12 which turns with the shaft. The seal is compressed between the opposed annular surfaces 13 and 14 of the members 11 and 12, where it serves to retain grease, oil or other lubricant, while excluding dust, water or other foreign matter.

The improved seal is characterized by two axially spaced annular plates 15 and 16 which are connected together at their outer peripheries by a diaphragm 17 of synthetic rubber, leather or other soft flexible material. The rear plate 15 of the seal is fixedly secured within an opening in the housing 11, in oil-tight engagement with the latter, and is preferably press-fitted into a bore 18 adjacent the surface 13. The front plate 16 is provided with a counterbore 19, and a rigid sealing ring 20 of "Oilite" or other suitable anti-friction material is press-fitted into the bore 19.

The sealing ring 20 is adapted to be pressed into oil-tight engagement with the surface 14 of the member 12 on the shaft, in relatively rotatable association with the latter. The sealing ring 20, together with the front plate 16 which carries the same, is pressed axially away from the rear plate 15 by a coil spring 21 which bears at its rear end against the plate 15 and at its front end against the press-fitted sealing ring 20. The plate 15 is provided, outwardly of the spring 21, with an axially extending flange-like formation in which a plurality of pockets 22 are formed for the reception of a corresponding number of arcuate tongues 23 which project axially into such pockets from the plate 16. The tongues 23 interlock circumferentially with the pockets 22 to prevent the front plate 16, with the sealing ring 20 from turning with respect to the rear plate 15.

From the foregoing description it will be appreciated that the improved seal is a self-contained unit which can be inexpensively and easily manufactured. The press fitting of the sealing ring 20 within the front plate 16, in direct engagement with the front end of the spring 21, renders unnecessary the use of any springs behind the front plate, thereby materially simplifying assembly of the parts. In other words, the sealing ring 20 acts as a retainer for the spring 21.

I claim:

1. In an end-thrust seal, two axially spaced centrally apertured front and rear plates, said plates being provided with axially projecting formations which slidingly fit together to form an axially continuous enclosure, a flexible diaphragm connecting said plates outwardly of the axially projecting formations, a sealing ring secured to the front plate at one end of the enclosure, and a coil spring confined within the enclosure and compressed between the rear plate and the sealing ring.

2. In an end-thrust seal, two axially spaced centrally apertured front and rear plates, said plates being provided with axially projecting formations which fit together to form an axially continuous enclosure, a flexible diaphragm connecting said plates outwardly of the axially projecting formations, a sealing ring of greater diameter than the enclosure press-fitted into a counterbore formed in the front plate at one end of the enclosure, and a coil spring confined within the enclosure and compressed between the rear plate and the sealing ring.

RUDOLPH J. VEDOVELL.